3,281,251
DEHYDRATION OF GREEN PEAS
Robert A. S. Templeton, Cereal House, 58 Mark Lane,
London, England
No Drawing. Filed Oct. 4, 1962, Ser. No. 228,233
5 Claims. (Cl. 99—204)

The present invention relates to the production of dehydrated foodstuffs and is principally, but not exclusively, directed to the production of dehydrated peas of an improved quality.

It is a well-known phenomenon in the field of dehydrated foodstuffs that, on reconstitution, the foodstuff does not swell to its original volume. Thus, for example, a proportion of dehydrated peas tend to remain wrinkled. This fact is believed to be due to permanent damage to the capillary system of the foodstuff during the dehydration operation.

In order to overcome this difficulty it has been proposed to dry vegetables by first freezing the juices in the vegetable so that the capillary system is swollen by the ice formation and then by drying out the moisture from the vegetable whilst it is held in the frozen condition. It will be appreciated that the dehydration of a vegetable, which may involve reducing an original moisture figure of 80% down to about 10% or less, can only be effected very slowly when the vegetable is held in the frozen condition and in consequence that method of producing dehydrated products is expensive both in the cost of the equipment required and in ordinary operating costs.

It is an object of the invention to provide a simple and inexpensive process for the dehydration of vegetables, which can provide results comparable to those obtained by the use of the freeze drying process above referred to and superior to those provided by conventional drying processes for foodstuffs which are dried without being reduced to particle form.

The present invention provides a simple method of counteracting the tendency to permanent shrinkage. In the method of the present invention dehydration is carried out in a conventional manner, which involves the evaporation of moisture from a foodstuff by the application of heat to maintain it at or above ordinary atomspheric temperature, whilst the foodstuff may simultaneously be subjected to reduced pressure conditions to accelerate the removal of moisture.

The present invention provides the novel step, in an otherwise conventional dehydration process, of immersing the foodstuff before or during the drying process in a heated solution of a crystalline substance, preferably a sugar, for a sufficient length of time to achieve appreciable take-up of the crystalline substance into the foodstuff.

The crystalline substance must be a substance which is readily soluble in water, non-toxic and of acceptable taste and preferably colourless. Sugars such as sucrose, dextrose and maltose are particularly useful for the process of the present invention, but in some cases may be replaced by salts, such as sodium chloride or certain other salts of inorganic acids, which satisfy the above criteria, and also in some cases by the alkali or ammonium salts of organic acids.

The solution of crystalline substance is preferably held at a temperature above 140° F. and preferably about 200° F. (about 93° C.). The foodstuff can however be immersed in a boiling solution provided that the immersion time is sufficiently short to avoid much cooking and structural change of the foodstuff and this will, of course, depend on the nature of the foodstuff under treatment.

The immersion time for satisfactory results will depend upon the foodstuff, the temperature of the impregnating solution and the concentration of the crystalline substance therein. It is impossible to specify precise times, since the immersion time required for a particular vegetable or fruit may vary from year to year, depending upon whether the season is wet or dry. It may be said, however, that the impregnation must be carried out for a sufficient time to secure penetration of the solution into the cells of the foodstuffs, at least in the surface region.

Whilst in general it may be said that the impregnation time will be reduced by utilising a saturated solution of crystalline substance, dilute solutions are in many instances more suitable, since less crystalline substance is carried over in the liquor remaining on the surface of the foodstuff when it is removed from the impregnating solution. In fact, it is found that solutions containing as little as 1% of crystalline substance may be utilised with advantage.

One way of carrying the process into effect is to treat a raw vegetable, for example whole peas or carrots cut into the form of dice, in a 5–15% sucrose solution at a temperature of 150–212° F. for 2 to 5 minutes prior to the commencement of dehydration in a conventional manner in warm air. It has been found with this example that the immersion of the vegetable in a 5% sucrose solution for as short a period as four minutes at 200°F. had a considerable effect on the ultimate product.

In this same manner of carrying the invention into effect the shrink-reducing treatment may be carried out as part of the conventional blanching treatment, commonly employed as a preliminary step in the dehydration of vegetables.

Although it is possible to carry out the treatment as part of the blanching step, it is also possible to effect the immersion of the vegetable in sugar solution after blanching and after some dehydration has taken place. Thus, with some vegetables it is possible to carry out the treatment with sugar solution when the water content has been reduced to, say, 50%. The take-up of the sugar solution into the vegetable is facilitated by this method.

A significant improvement in the process can be achieved if it is carried out under alkaline conditions or if the foodstuff is treated in alkaline medium at the time of any initial heat treatment, such as blanching in hot water or steam or between that treatment and immersion in sugar or other crystalline solution. The alkaline treatment leads to a significant improvement in the colour retained by the final dried product.

In certain vegetables, such as peas, there is present a waxlike layer at or just inside the surface of the peas. By the use of alkaline conditions it is possible to render the foodstuff much more permeable for release of interior pressure due to blanching and to penetration by sugar solution and this is believed to be due to the leeching away of waxlike substances by alkali.

The novel treatment of the present invention is found to produce a product, which, when reconstituted, more nearly resumes the shape of the original material than does a similar product prepared from similar raw material and using otherwise the same dehydration conditions. The reconstituted product is of more regular texture and of relatively larger sizer and is freer of objectionable hard particles of imperfectly rehydrated material.

The use of an alkali softening step employing a mild alkali, such as sodium carbonate, is found to reduce very substantially the time required for cooking dried peas, as compared with peas dehydrated by conventional methods.

The take-up of sugar (sucrose) into the product during dehydration in the case of many fruits and vegetables, such as peas, carrots or apples, results in a product, which on reconstitution, is more palatable than a corresponding product which had not been subjected to the treatment of the present invention during its production. It is also found that in many instances the product shows better colour retention and may be reconstituted more rapidly.

It is found possible to add additional flavour, such as mint, to the product, simultaneously with the treatment with sugar solution.

Furthermore, the colour of the product may be improved by the inclusion of natural vegetable colours, such as chlorophyll, anthocyanins and carotenoids, to impart green, red and yellow colours respectively.

My microscopical examination of a product, which was dehydrated after immersion in a coloured crystalline solution it was found that the solution did not merely coat the surfaces of the pieces of vegetable but penetrated to their interior in a marked degree. Thus, the crystals, in course of, and after drying, give support and strength to the capillary system of the vegetable substance against the normal tendency to collapse and wrinkle.

Sugar is the crystalline substance ordinarily used in the process, since it is relatively cheap and can be used in strong solutions without imparting a disagreeable flavour to the product. Indeed in most cases the sugar taken up into the product imparts an agreeable flavour thereto. In some cases however sugar may be replaced wholly or in part by common salt, sodium chloride and where the product may suitably carry this flavour, it is advantageous.

In a first example of the process, blanching and treatment with sugar were carried out together.

Peas were blanched in an aqueous solution containing 0.3% sodium carbonate and 10% sugar at a temperature of 205° F. for 2 minutes before drying to a low residual moisture value in warm air. This treatment rendered the peas more permeable for the escape of vapour and intake of sugar solution than they would have been if blanched under normal conditions and the reconstitution in water after drying was facilitated.

In a second example peas were blanched in a sodium carbonate solution having a pH value of 9.5 at a temperature of 205° F. for 3 minutes. This treatment rendered the peas more permeable for the escape of vapour and intake of sugar solution than they would have been if blanched under normal conditions. The peas were then immersed in a 10% sugar solution at a temperature of 150° F. for 5 minutes and dried to a low residual moisture value in warm air. The reconstitution in water after drying was facilitated by the treatment.

In a third example peas were blanched in a sodium carbonate solution having a pH value of 9 at a temperature of 200° F. for 3 minutes. After blanching the peas were dried in warm air until the residual moisture became 60%. The partially dried peas were then immersed in a 10% solution of sugar at a temperature of 200° F. for 5 minutes, after which they were finally dried in warm air until the residual moisture became 7% by weight. This treatment rendered the peas more permeable for the escape of vapour and intake of sugar solution than they would have been if blanched under normal conditions and the reconstitution in water after drying was facilitated.

In a fourth example peas were blanched in a sodium carbonate solution having a pH value of 9 at a temperature of 200° F. for 3 minutes. After blanching the peas were immersed in 10% sugar solution under the conditions set forth in the second example and dried in warm air until their moisture content become 7.5% by weight. The alkaline blanching treatment rendered the peas more permeable for the escape of vapour and intake of sugar solution than they would have been if blanched under normal conditions.

In a still further example the preliminary blanching was carried out in an alkaline solution having a pH value of about 10.5 at a temperature of 175° F. for 6 minutes. The remainder of the treatment was in accordance with the preceding example. This treatment led to a product in which the problem of wrinkling was almost entirely eliminated and the percentage of the peas, which remained wrinkled on reconstitution, was markedly less than was the case with peas in a control batch, blanched in conventional manner in boiling water, but otherwise processed by the same procedure.

In a still further example peas were blanched using the alkaline blanching step set forth in the preceding example, namely blanching for 6 minutes in a solution having a pH value of 10.5 at 175° F. The peas were thereafter gently dried in warm air without impregnation with crystalline substance.

The present invention may be applied to the dehydration of leaf vegetables, such as cabbage. In the production of dehydrated cabbage the crystalline substance used is preferably one having less taste than common salt or sugar. Many examples of such substances, which can be used in foodstuffs, are known.

In some instances less sweet sugars, such as dextrose, lactose or maltose may be employed in place of sucrose in the dehydration of vegetables and fruits.

I claim:
1. The process for dehydrating green peas comprising the steps of blanching them in a hot dilute aqueous alkaline solution for a time sufficient to soften the surface skin of the peas to increase the vapor permeability of said skin, impregnating the peas with a sugar solution and thereafter drying the peas in warm air.

2. The process of claim 1 in which the blanching medium has a pH value between about 9 and about 10.5 and a temperature above about 175° F. and in which the blanching is continued for about 3 to about 6 minutes.

3. The process of claim 1 in which the blanching medium is a dilute solution of sodium carbonate at a pH value of about 9 to about 9.5 and a temperature about 200° F. to about 205° F. and in which the blanching is continued for about 3 minutes.

4. The process of claim 1 in which the sugar solution impregnation is carried out simultaneously with the blanching.

5. The process of claim 1 wherein the sugar solution comprises hot sucrose.

References Cited by the Examiner
UNITED STATES PATENTS

| | | | |
|---|---|---|---|
| 116,729 | 7/1871 | Lowe | 99—204 |
| 144,592 | 11/1873 | Barbee | 99—204 |
| 534,368 | 2/1895 | Hughes | 99—204 |
| 1,182,270 | 5/1916 | Hann | 99—204 |
| 1,259,634 | 3/1918 | King | 99—204 |
| 1,393,540 | 10/1921 | Kelly | 99—204 |
| 1,518,537 | 12/1924 | Moore | 99—204 |
| 2,420,517 | 5/1947 | Brandner et al. | 99—204 |
| 2,895,836 | 7/1959 | Lazar et al. | 99—204 |
| 2,973,276 | 2/1961 | Cyr | 99—204 |

A. LOUIS MONACELL, *Primary Examiner.*

RAYMOND N. JONES, *Examiner.*

ROSCOE S. AULL, *Assistant Examiner.*